Patented June 24, 1930

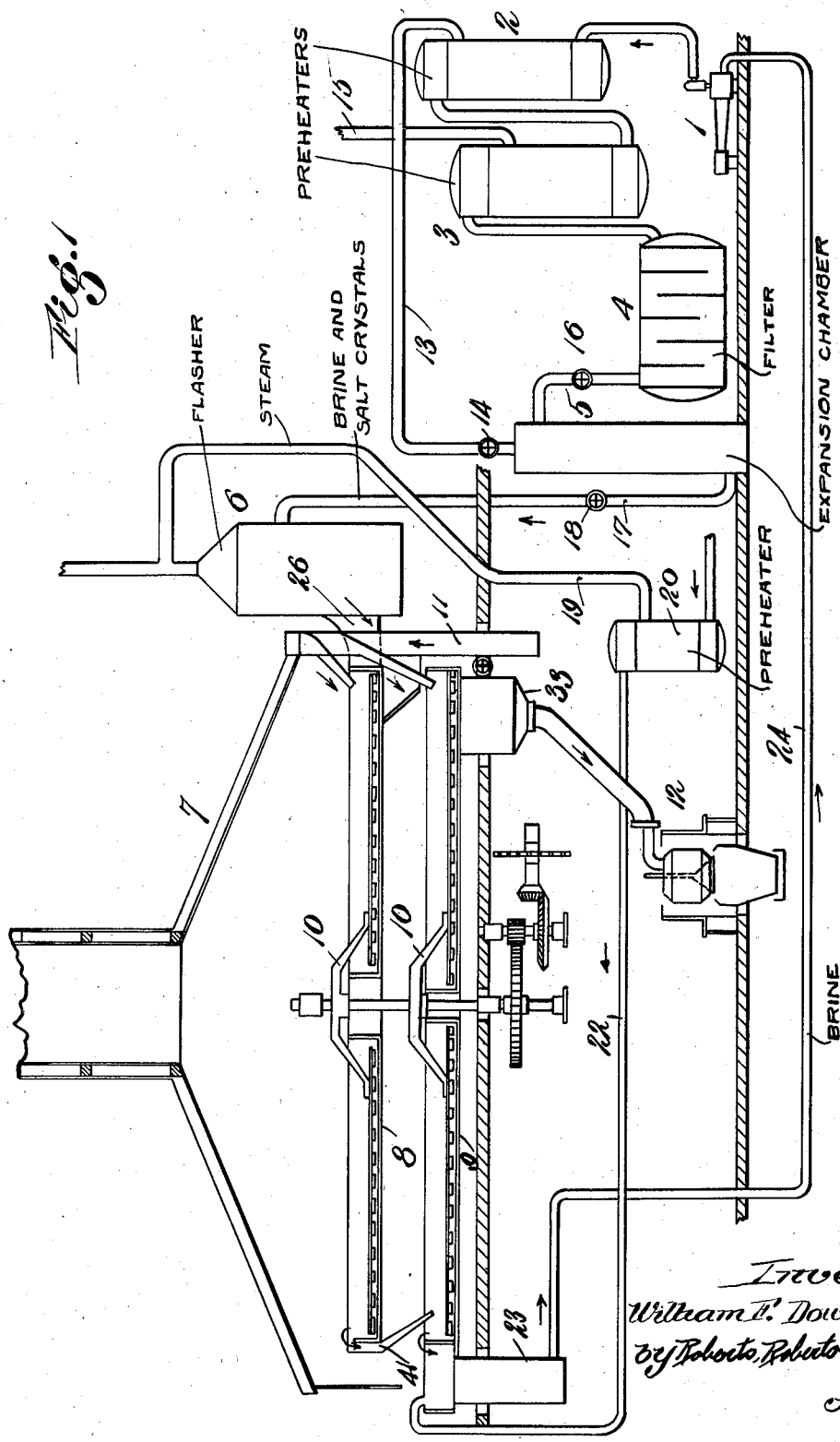

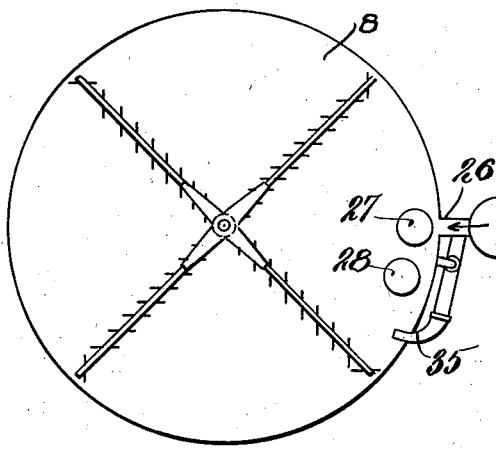
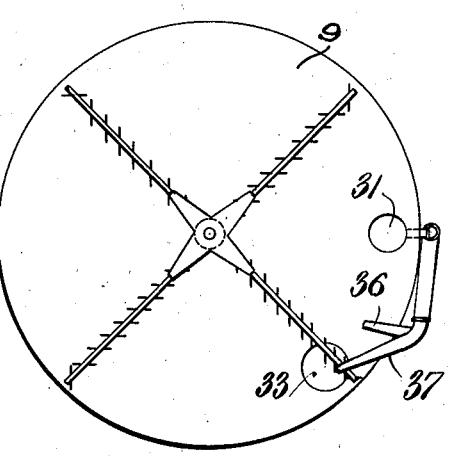
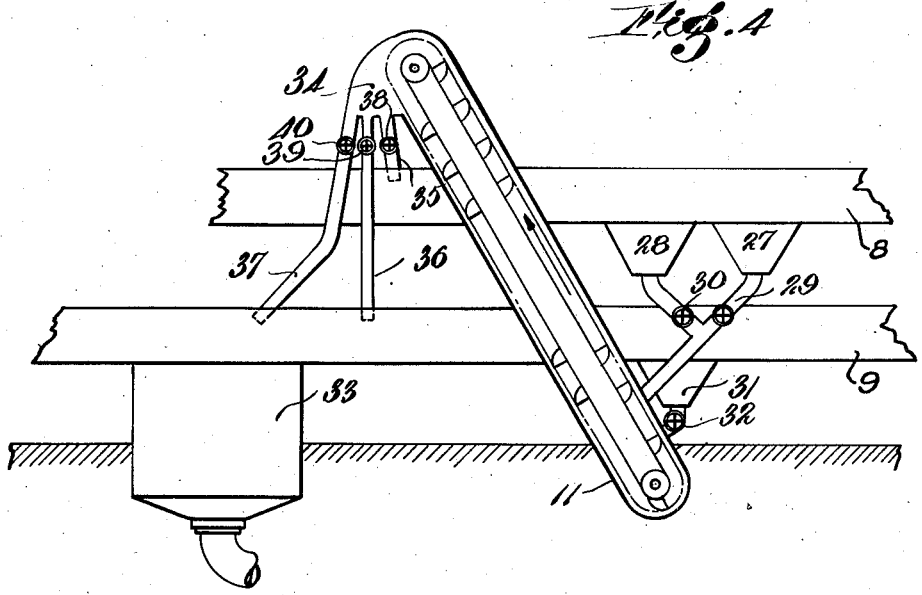

1,768,399

UNITED STATES PATENT OFFICE

WILLIAM F. DOWNING, JR., OF ST. CLAIR, MICHIGAN, ASSIGNOR TO DIAMOND CRYSTAL SALT COMPANY, OF ST. CLAIR, MICHIGAN, A CORPORATION OF MICHIGAN

METHOD AND APPARATUS FOR THE MANUFACTURE OF SALT

Application filed May 29, 1924. Serial No. 716,776.

The present invention relates to a process for the recovery of salt crystals or aggregates from brine, whereby the relative amounts of the grain sizes produced may be controlled, and to means for readily effecting such control of the product.

The crystallization of salt from brine has been carried out in various ways, among which may be mentioned the well-known Alberger process, wherein the brine is superheated under a high degree of pressure which is then suddenly removed, resulting in the immediate separation of a large number of minute crystals of salt. It has also been proposed (C. L. Weil, United States Patent 1,478,990) to reduce a brine solution to the point of incipient crystallization in a vacuum pan, to reduce a second brine solution substantially to the saturation point by the Alberger process, and to then mix and cool the solutions thus obtained, which brings about a rapid separation of salt crystals and crystalline aggregates.

It is desirable to provide means for determining the sizes of the crystal grains obtained, which means does not involve a modified operation of the system as a whole, which is awkward or inconvenient and generally undesirable in practice.

It is not necessary that the process shall result in the formation of uniform granules of a specific size or of a narrow range of sizes, but it is desirable that the relative amounts of the various sizes produced may be controlled and that changes thereof may be made promptly and easily without substantially affecting the mode of conducting the various stages of the process.

By the present invention the brine is preferably first reduced by any suitable treatment to a saturated or supersaturated condition (or to the point of incipient crystallization); it is then passed through an extended course of relatively slow crystallization treatment which is controllable as to length and duration; and finally the crystals are separated. In order to obtain an increased proportion of the coarser sizes, a part of the crystals may be returned to the supernatant liquor, to be repassed through one or more stages of the crystallization system.

A specific embodiment of the invention which is typical of its application in practice will be described, reference being made to the following drawings in which:

Fig. 1 is a diagrammatic view of the complete apparatus;

Fig. 2 is a reduced plan view of the upper evaporating pan;

Fig. 3 is a reduced plan view of the lower evaporating pan; and

Fig. 4 is a side elevation of the elevator and the connecting members associated therewith.

Referring to Fig. 1, the apparatus comprises a pump 1 which forces the brine through preheaters 2 and 3, thence through filter 4 and into the flashers or expansion chambers 5 and 6. From flasher 6 the mixture of brine and suspended salt passes to the evaporating system represented at 7 and consisting of a series of crystallizers such as the evaporating pans 8 and 9, provided with scrapers or rakes 10, elevator 11 and an outlet discharge leading to the centrifugal separator 12. The preheater 2 is connected with the upper portion of the flasher 5 by the pipe 13, controlled by valve 14, whereby exhaust steam from the flasher may be utilized in the preheater, while preheater 3 is connected with an independent steam supply through pipe 15. Filter 4 is connected to flasher 5 through valve 16. Flasher 5 is also connected to flasher 6 by pipe 17 having a valve 18. The upper portion of flasher 6 connects through pipe 19 with a preheater 20 wherein the raw brine is initially heated as it is pumped to the constant level tank 23 through pipe 22.

Flasher 6 has an outlet 26 leading directly into the upper pan 8 which pan is provided with two salt boots 27 and 28 having valved outlets 29 and 30 respectively which lead to the elevator 11 (Fig. 4). Pan 9 likewise is provided with a salt boot 31 connected through valve 32 with the elevator 11 and with a receiver 33 leading to the centrifugal separator 12.

Elevator 11 is provided at the top with a hopper 34 into which it discharges the salt and the brine associated therewith. From the hopper, outlets 35, 36 and 37, controlled by valves 38, 39 and 40 respectively, direct the salt and brine to pans 8 and 9. Outlet 35 leads to pan 8 in advance of boot 27 and outlets 36 and 37 lead into pan 9 both in advance of boot 31 and outlet 37 above receiver 33.

In operation of the process, brine is introduced through the preheater 20, thence through pipe 22 to constant level tank 23, and drawn thence (through pipe 24) into preheaters 2 and 3, by means of pump 1. Here the temperature is raised substantially above its normal boiling point, but without vaporization due to the super-imposed pressure under which it is maintained. At this pressure it is led through the filter where an extended surface is presented to the liquid, and facilitates the separation of less soluble salts such as calcium sulphate. From here the super-heated brine solution escapes through valve 16 into the first flasher 5 where its pressure is allowed to drop appreciably. This is accompanied by violent ebullition and rapid volatilization of the solvent. The steam thus evolved passes off through valve 14 into the jacket of preheater 2 where its sensible heat is utilized, as already mentioned.

Under this treatment incipient crystallization of the salt takes place, and a considerable portion of the salt content of the brine separates in the form of extremely small crystals. These crystals are of such dimensions as to remain substantially in suspension in the brine while it passes through pipe 17 and valve 18 into the second flasher 6 where the pressure is reduced to that of the atmosphere. A second boiling and evaporation of the brine is thus effected, and further precipitation of finely divided salt crystals takes place. The steam thus produced is normally returned to the steam jacket of the preheater 20.

From the flasher 6 the suspension of brine and salt crystals is withdrawn through outlet 26 into the upper pan 8 of the crystallizing or evaporating system 7. If it is desired to produce a large proportion of fine grained salt, valve 29 in the salt boot 27 may be opened, permitting substantially all of the salt crystals to pass directly therethrough into the elevator 11 which raises it to the hopper 34 from which it may be directed into the outlet 37 by opening valve 40, to receiver 33 and thence direct to the centrifugal 12.

On the other hand if the demand requires a considerable amount of coarse grained salt crystals, which is usually the case, valve 29 is closed, thus permitting the rakes 10, which are revolved through the brine solution in the usual manner, to carry the sludge of brine and salt crystals around the pan, directing it toward the periphery, until it reaches the boot 28 where it is dropped. By opening valve 30 therein, the salt passes into the elevator 11, and is lifted to the hopper 34, and flows through valve 40 to receiver 33 and into the centrifugal.

If a still larger amount of the coarser sizes is required the salt is passed through the same course as just described, but valve 39 instead of valve 40 is opened in the chute 36 leading from the hopper to pan 9, thus permitting the salt to flow into the lower evaporating pan at a point from which the rakes 10 will carry it around through the saturated brine before dropping into the receiver 33 as before.

In case coarse grain sizes only are to be made, the procedure as just described may be followed, but valve 32 is also opened, thus permitting a portion of the salt which has separated in the second evaporating pan to enter the elevator. In this case, valve 38 is also opened, allowing a portion of the salt from the hopper 34 to flow again into the upper pan. In this manner, a portion of the salt crystals, after passing through both pans, are returned to the crystallizing system and permitted to continue their growth in contact with the concentrated or saturated brine and to unite with the other crystals.

Throughout the crystallizing part of the process, the excess of brine solution which may be fed to the evaporating pan is allowed to escape from pan 8, through the overflow 41 into pan 9 while the overflow from pan 9 falls into the supply tank 23 from which it may be fed through pipe 24 to the pump 1 and thus be returned to th cycle of operations together with the fresh brine, which is introduced through preheater 20.

From the above disclosure it will be apparent that, by independently controlled mechanism, the grain sizes and the relative proportions in which they will be produced by the crystallizing system may be quickly and easily governed, without otherwise altering existing apparatus or its mode of operation. It is also to be noted, that all of the advantages of the present art of salt manufacture and purification are retained and that the product, whether of fine or coarse grained crystals, is accordingly of a high degree of purity.

I claim:

1. A process for the recovery of salt from brine, comprising flowing brine in an open stream through an extended course, characterized by permitting the evaporation thereof throughout, diverting a portion of the brine and suspended crystals from one point in the course, passing the diverted portion of the stream to a prior point of the course, thereby to control the character of the salt crystals, and finally removing the crystallized salt from the supernatant brine solution.

2. A process for the recovery of salt from brine, comprising reducing the same to a state of incipient crystallization, flowing the brine suspension of fine crystals thus produced in an open stream through an extended course, characterized by permitting the evaporation thereof throughout, diverting a portion of the brine and suspended crystals from one point in the course, passing the diverted portion of the stream to a prior point of the course, thereby to control the character of the salt crystals, and finally removing the crystallized salt from the supernatant brine solution.

3. A process for the recovery of salt from brine comprising superheating the brine, permitting the superheated brine to flash, thereby producing relatively fine crystals of salt, flowing the brine containing the fine crystals along a predetermined course to permit the fine crystals to build up, and withdrawing a portion of the brine and suspended crystals at different points along said course depending upon the size or sizes of crystals desired.

4. A process for the recovery of salt from brine comprising concentrating the brine solution substantially to its saturation point, subjecting the saturated solution to a course of crystallization treatment, controlling the effective time of said crystallization treatment by re-passing a portion of said solution and suspended crystals through a selected stage thereof, and separating the crystals thus formed from the supernatant liquor.

5. A process for the recovery of salt from brine comprising concentrating the brine substantially to the saturation point, conducting the saturated solution through a course of crystallization treatment, and returning portions of the resulting crystals from a later stage to an intermediate stage in the course of crystallization treatment.

6. A process for the recovery of salt from brine comprising concentrating the brine to substantially the saturation point, conducting the saturated solution through a prolonged course of crystallization treatment, and returning a portion of the resulting crystals from an intermediate stage to an earlier stage of the crystallization treatment.

7. A process for the recovery of salt from brine comprising concentrating the brine to substantially the saturation point, conducting the saturated solution through a prolonged course of crystallization treatment and successively diverting, and returning portions of the resulting crystals at predetermined stages thereof, throughout said course of crystallization treatment.

8. A process for the recovery of salt from brine comprising concentrating the brine to substantially the saturation point, conducting the saturated solution through a prolonged course of crystallization treatment diverting a portion of the solution, separating a part of the supernatant liquid from the resultant crystals in said diverted portion and returning a portion of the crystals to an earlier stage of the crystallization treatment.

9. A process for the recovery of salt from brine comprising concentrating the brine to its saturation point, effecting partial separation of its contents in finely divided crystalline form, conducting the brine and crystals through an extended crystallization system, separating a part of the tail brine from the salt crystals, and returning a portion of the said crystals to a predetermined stage in the crystallization system.

10. Apparatus for the manufacture of salt from brine, comprising an open evaporator, outlets for withdrawing salt from said evaporator, and means for returning salt to said evaporator provided at a plurality of points at selectively spaced and different intervals relative to said outlets.

11. Apparatus for the manufacture of salt from brine comprising an evaporator, means for conducting the brine through an extended course therein, an outlet from said evaporator, and adjustable inlet means for introducing brine severally at different points in selectively spaced relation to said outlet.

12. Apparatus for the manufacture of salt from brine comprising an open evaporator, means for conducting the brine through an extended course therein, outlets from said evaporator, a plurality of inlet means for severally introducing brine in selectively and differently spaced relation to said outlets, and means for returning the separated salt crystals from one of said outlets to the evaporator through said inlet means.

13. Apparatus for the manufacture of salt from brine, comprising a plurality of evaporating pans arranged and interconnected in series, a plurality of means for introducing brine at predetermined portions of said pans, means for conveying the brine through said pans, means for withdrawing separated salt crystals from certain portions of said pans, and means for returning said separated crystals severally to selectively spaced portions of said pans.

14. Apparatus for the manufacture of salt from brine comprising a plurality of evaporating pans arranged and interconnected in series, a plurality of means for withdrawing the brine and crystals from said pans at selectively spaced points in its path therethrough, means for reintroducing said brine and crystals at selectively spaced points in said pans, and means for withdrawing separated salt crystals therefrom.

15. Apparatus for the manufacture of salt from brine comprising a plurality of evaporating pans arranged and interconnected in series, a plurality of means for introducing and withdrawing brine from said pans at selectively spaced points in its path through said pans, means for withdrawing separated salt crystals therefrom, and means for returning a portion of said crystals to said evaporating pans.

16. Apparatus for the manufacture of salt from brine comprising an evaporating pan having a brine inlet and a plurality of salt outlets in series, means for moving salt crystals from said inlet to said outlets, and means for selectively closing said outlets.

17. Apparatus for the manufacture of salt from brine, comprising an evaporating pan having a plurality of salt outlets, in series, a flasher, and means including a plurality of inlets for delivering brine from the flasher to said pan at points selectively and differently spaced relative to said outlets.

Signed by me at St. Clair, Michigan, this sixteenth day of May, 1924.

W. F. DOWNING, Jr.